(12) United States Patent
Shere et al.

(10) Patent No.: US 10,378,983 B2
(45) Date of Patent: Aug. 13, 2019

(54) FOAM PRESSURE SENSOR

(71) Applicant: Rogers Corporation, Rogers, CT (US)

(72) Inventors: Aniruddha Shere, Chelmsford, MA (US); Karl E. Sprentall, Scottsdale, AZ (US)

(73) Assignee: ROGERS CORPORATION, Chandler, AZ (US)

( * ) Notice: Subject to any disclaimer, the term of this patent is extended or adjusted under 35 U.S.C. 154(b) by 234 days.

(21) Appl. No.: 15/326,148

(22) PCT Filed: Jul. 13, 2015

(86) PCT No.: PCT/US2015/040139
§ 371 (c)(1),
(2) Date: Jan. 13, 2017

(87) PCT Pub. No.: WO2016/010894
PCT Pub. Date: Jan. 21, 2016

(65) Prior Publication Data
US 2017/0199095 A1   Jul. 13, 2017

Related U.S. Application Data

(60) Provisional application No. 62/024,106, filed on Jul. 14, 2014.

(51) Int. Cl.
*G01L 9/12* (2006.01)
*G01L 9/00* (2006.01)

(52) U.S. Cl.
CPC .............. *G01L 9/0005* (2013.01); *G01L 9/12* (2013.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/0069; G01L 19/0618; G01L 19/0645;
(Continued)

(56) References Cited

U.S. PATENT DOCUMENTS

2008/0202251 A1* 8/2008 Serban ................... G01L 1/142
73/780
2010/0181871 A1* 7/2010 Daniel .................... G01L 1/16
310/338

(Continued)

FOREIGN PATENT DOCUMENTS

| CN | 101421590 A | 4/2009 |
| CN | 102308270 A | 1/2012 |
| CN | 102959378 A | 3/2013 |

OTHER PUBLICATIONS

Notification of Transmittal of the International Search Report for the International Application No. PCT/US2015/040139; International Filing Date: Jul. 13, 2015; dated Sep. 14, 2015; 6 pages.
(Continued)

*Primary Examiner* — Andre J Allen
(74) *Attorney, Agent, or Firm* — Cantor Colburn LLP

(57) ABSTRACT

A pressure sensor includes a first plate (102), a second plate (104) and a foam (106) disposed between the first and second plate. The foam is a polyurethane foam having an average cell size of about 50 to 250 urn and a density of between 5 to 30 lbs/ft3.

9 Claims, 5 Drawing Sheets

(58) Field of Classification Search
CPC ... G01L 9/0052; G01L 9/0055; G01L 9/0073; G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04; G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

USPC .................................................. 73/700–756

See application file for complete search history.

(56) References Cited

U.S. PATENT DOCUMENTS

| 2012/0055257 | A1  | 3/2012 | Shaw-Klein |            |
|--------------|-----|--------|------------|------------|
| 2013/0248024 | A1* | 9/2013 | Dunn       | G01L 9/0072 |
|              |     |        |            | 137/551    |
| 2018/0145244 | A1* | 5/2018 | Otagiri    | G01L 5/226 |
| 2018/0231171 | A1* | 8/2018 | Olsen      | F16M 7/00  |
| 2018/0254405 | A1* | 9/2018 | Sprentall  | H01L 41/1132 |

OTHER PUBLICATIONS

Wegener, M., et al., "Polyethylene Terephthalate (PETP) Foams as Ferroelectrets" ELECTRETS, 2005, International Symposium on Salvador, Bahia, Brazil, Sep. 11-14, 2005, (Sep. 11, 2005); pp. 28-30.

Written Opinion of the International Searching Authority for the International Application No. PCT/US2015/040139; International Filing Date: Jul. 13, 2015; dated Sep. 14, 2015; 9 pages.

Zhang, X., et al., "Piezoelectric Performance of Polytetrafluoroethylene Ferroelectrets" 2013 Annual Report Conference on Electrical Insulation and Dielectric Phenomena, (Oct. 20, 2013) pp. 579-582.

First Office Action dated Oct. 12, 2018 for Patent No. 201580038896.5 which is related to U.S. Appl. No. 15/326,148 with Translation; 17 pages.

* cited by examiner

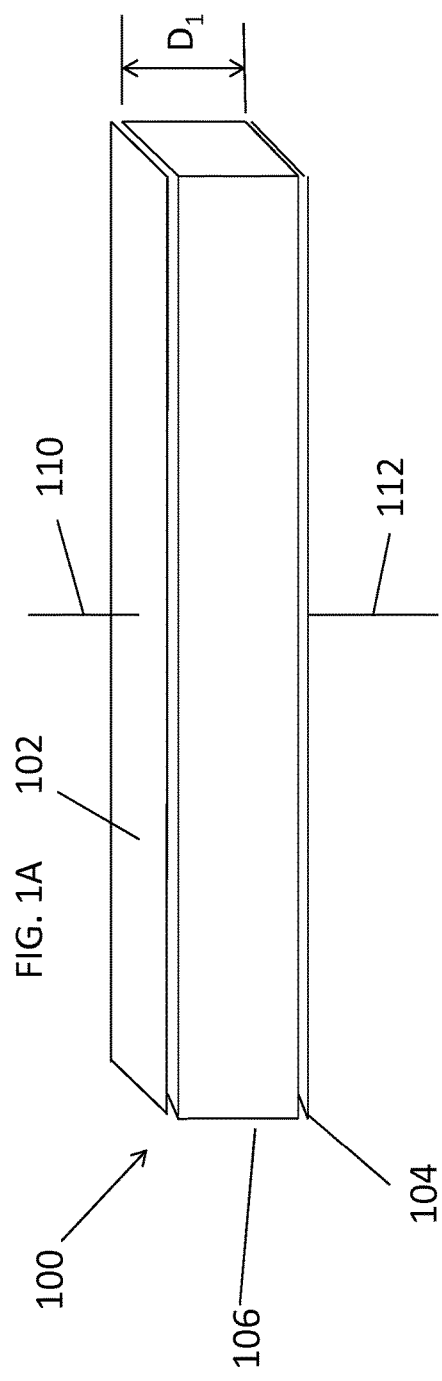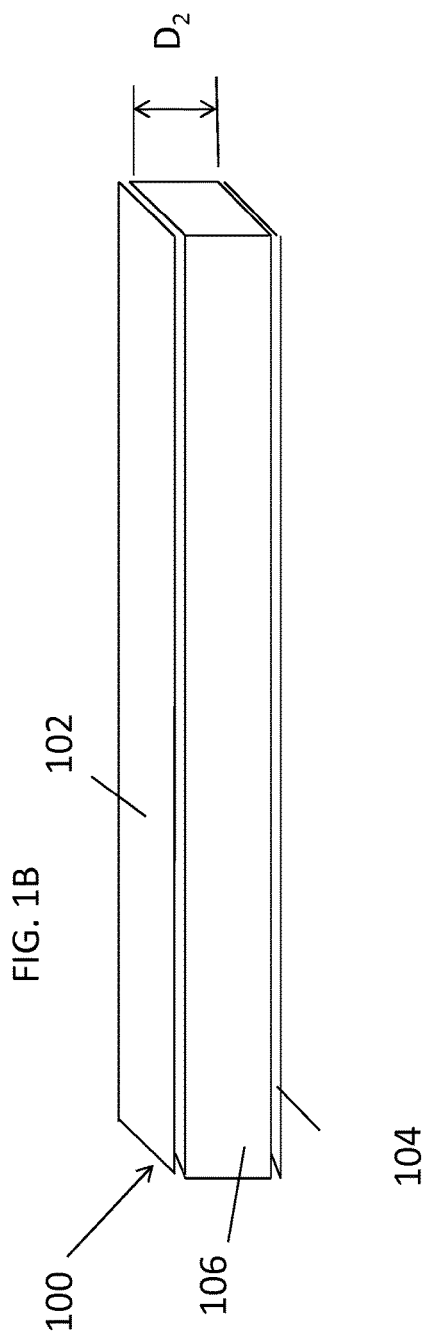

FOAM PRESSURE SENSOR

BACKGROUND

This invention relates to pressure sensors and, more particularly, to a capacitive foam pressure sensor and systems including such sensors.

There are several manners in which pressure may be detected. One manner is to utilize a pressure sensor. Pressure sensors are used for control and monitoring in thousands of everyday applications. Pressure sensors can also be used to indirectly measure other variables such as fluid/gas flow, speed, water level, and altitude. Pressure sensors can alternatively be called pressure transducers, pressure transmitters, pressure senders, pressure indicators, piezometers and manometers, among other names.

The uses for pressure sensors are many. For instance, a pressure sensor may be used to measure impact forces as well as sustained pressures. These uses are just examples and others may be provided.

SUMMARY

Conductive electrodes are placed on either side of a foam sheet. By measuring the parallel plate capacitance of the two electrodes, the degree to which the foam has been compressed can be determined. Through use of different conductive materials or printed electronic patterns, more advanced sensors can be made.

In one embodiment, a pressure sensor is disclosed that includes a first plate, a second plate and a foam disposed between the first and second plate. The foam is a polyurethane foam having an average cell size of about 50 to 250 μm and a density of between 5 to 30 lbs/ft$^3$.

In another embodiment, a pressure sensor that includes a first plate, a second plate and a foam disposed between the first and second plate is disclosed. The pressure sensor also includes a conductor clad piezoelectric film disposed on a surface of one of the first or second plates.

BRIEF DESCRIPTION OF THE FIGURES

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 1A and 1B show an example of a foam capacitor;

DETAILED DESCRIPTION

Figure 2:
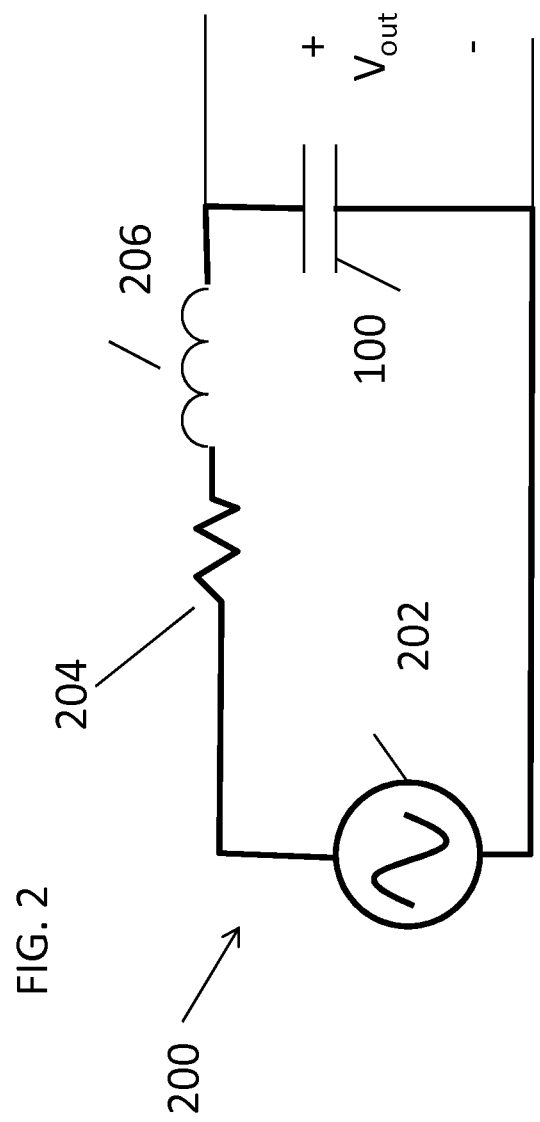
FIG. 2 shows a circuit for reading the capacitance of a foam capacitor.

According to one embodiment a pressure sensor is disclosed. The pressure sensor may be a standalone sensor or may be utilized as part of a system that includes a pressure sensor. The disclosed pressure sensor takes the form, in one embodiment, of a two conductive electrodes in the form of plates separated by a foam material. As pressure is applied on one or both of the plates, the foam is compressed. Changing the distance between the plates causes the capacitance of the sensor to change. This change is related to the amount of pressure exerted.

The disclosed sensor can be utilized in many different contexts, including, but not limited to: impact sensors for helmets; wear sensors for helmets and footwear; detection of passengers for mass transit; and automotive seats—able to tell person from luggage for seatbelt sensor.

FIGS. 1A and 1B show an example of a pressure sensor embodied as capacitor 100 formed according to one embodiment. The capacitor includes a first electrode 102 and a second electrode 104. In one embodiment each electrode is a plate that has an area A. The electrodes are separated, in the illustrated embodiment, by a foam material (foam) 106.

As used herein, foam" or "foams" refer to a polymeric material having a cellular structure, where the cells can be open (reticulated) or closed. The properties of the foam (e.g., density, modulus, compression load deflection, tensile strength, tear strength, and so forth) can be adjusted by varying the components of the reactive compositions as is known in the art. The foams are soft and can have densities lower than 65 pounds per cubic foot (pcf), specifically less than or equal to 55 pcf (881 kg/m$^3$), more specifically not more than 25 pcf (400 kg/m$^3$), a void volume content of 20 to 99%, specifically 30 to 80%, based upon the total volume of the polymeric foam. In some embodiments, the foam has a density of 5 to 30 pounds per cubic foot (lb/ft$^3$) (80 to 481 kg/m$^3$), a 25% compression force deflection (CFD) 0.5 to 20 lb/in$^2$ (0.3 to 1.41 kg/m$^2$), and a compression set at 70° F. (21° C.) of less than 10%, specifically less than 5%. As is known in the art, a polymer foam is manufactured from a precursor composition that is mixed prior to or concomitant with foaming.

A wide variety of polymers can be used, including various thermoplastic thermoplastics or thermosetting resins. Examples of polymers that can be used include polyacetals, polyacrylics, styrene-acrylonitrile (SAN), polyolefins, acrylonitrile-butadiene-styrene (ABS), polycarbonates, polystyrenes, polyesters such as polyethylene terephthalates and polybutylene terephthalates, polyamides such as Nylon 6, Nylon 6,6, Nylon 6,10, Nylon 6,12, Nylon 11 or Nylon 12, polyamideimides, polyarylates, polyurethanes, ethylene propylene rubbers (EPR), polyurethanes, epoxies, phenolics, silicones, and the like, or a combination comprising at least one of the foregoing.

In some embodiments the foam is a polyurethane or silicone foam. Open celled, low modulus polyurethane foams are preferred, based on their favorable compression force deflection, compression set, as well as their good wear properties. The polyurethane foams can have an average cell size of about 50 to 250 μm (as can be measured in accordance with ASTM D 3574-95) a density of between about 5 to 30 lbs/ft$^3$, specifically 6 to 25 lbs/ft$^3$, a compression set of less than about 10%, and a force-deflection of between about 1-9 psi (7-63 kPa). Such materials are marketed, for example, under the trade name PORON by the Rogers Corporation, Woodstock, Conn. PORON foams have been formulated to provide an excellent range of properties, including excellent compression set resistance. Foams with such compression set resistance can provide cushioning and maintain their original shape or thickness under loads for extended periods of time.

The capacitance of the capacitor 100 is based on the separation of the plates 102, 104. That separation is shown as dimension $D_1$ in FIG. 1a and dimension $D_2$ in FIG. 1B. As illustrated, $D_1$ is greater than $D_2$.

The general form of the equation defining the capacitance of a capacitor can be written as:

$$C = \varepsilon(A/D) \quad (1)$$

where ε is the permittivity of the material between the plates (in this case, the foam), A is the area of the plates and D is distance between the plates.

Given that $D_1$ is greater than $D_2$, the capacitance of the capacitor in FIG. 1A will be less than the capacitance of the capacitor in FIG. 1B. Of course, either of these could include leads 110/112 connected to the plates 102/104 to allow the capacitor 100 to be attached to a circuit.

FIG. 2 illustrates a simple circuit 200 in which the capacitor 100 in FIGS. 1A/B may be utilized. The circuit includes a currently source source 202. In one embodiment, the current source 202 may provide current at varying frequencies or at a particular frequency. The circuit 202 may also include a resistor 204 and the capacitor 100. The resistor 204 could be an actual resistor or it may be a representation of the resistance of the circuit. The combination of the resistor 204 and the capacitor 100 will provide a low pass filter with a cutoff frequency defined by the values of R and C and that is inversely proportional to C. Thus, as C decreases, the cut off frequency increases and vice versa. From above, as the distance between the plates decreases, the capacitance increases. Thus, the relationship between the cutoff frequency and the distance is basically a proportional relationship. This allows the capacitor 100 to be used as a pressure sensor. That is, as pressure increases, capacitance increases.

In more detail, the cutoff frequency may generally be represented as:

$$f_c = \frac{1}{2\pi RC} \quad (2)$$

substituting in for C from above yields:

$$f_c = \frac{D}{2\pi RA\varepsilon} \quad (3)$$

Figure 3:
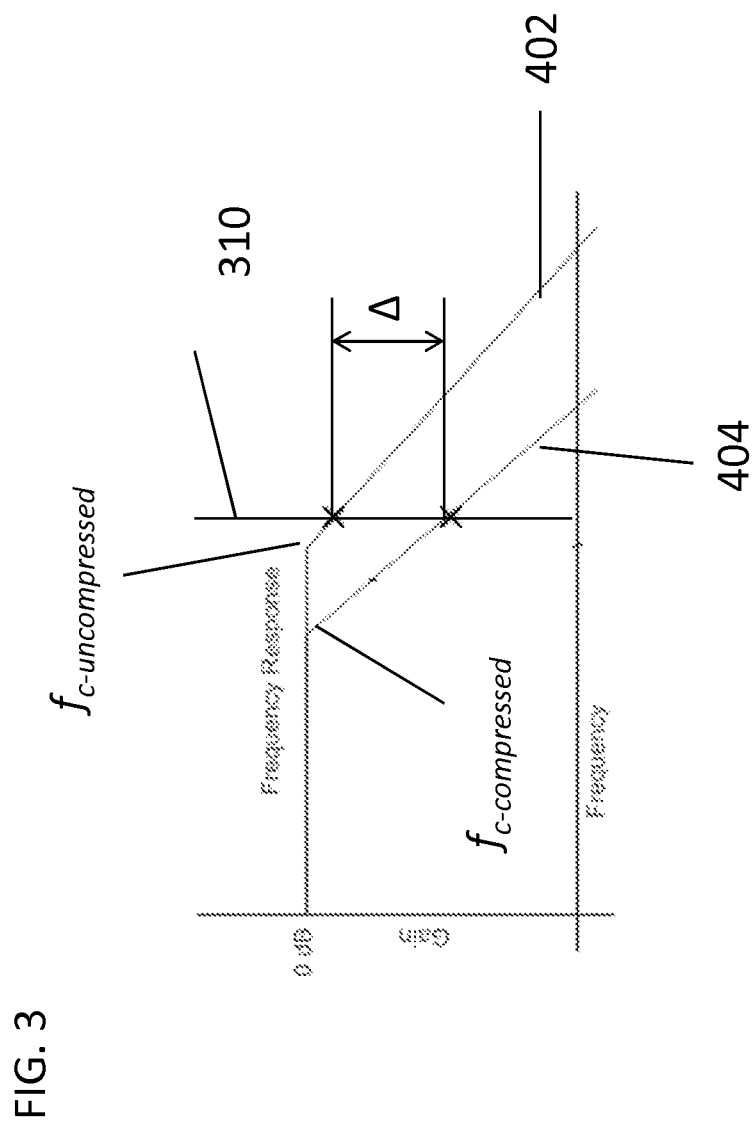
FIG. 3 shows an example response of a compressed and a non-compressed foam capacitor in a circuit as shown in FIG. 2.

This is shown further in FIG. 3 where frequency and plotted against gain (in dB). The first trace 302 shows an example response of circuit 200 when the foam 106 is not compressed as all. The second trace 304 shows an example response of circuit 200 when the foam 106 is fully compressed. The cutoff frequency $f_{c\text{-}uncompressed}$ is greater than the cutoff frequency $f_{c\text{-}compressed}$ meaning that the capacitance is increasing as D decreases. As D is related to the foam, as pressure increases, D decreases. Thus, as pressure increases, so does capacitance.

When the cutoff frequency decreases, at any frequency above this cutoff frequency (e.g., as shown by line 310), the difference (shown as Δ) between the output (e.g., Vout in FIG. 3) will be related to the amount the foam is compressed. That is, Δ may serve as a relative measurement of pressure (or at least a proxy thereto).

As will be understood, the circuit 2022 may also include an optional inductor 206. While the exact mathematical representation may be different than that described above, in such a case, the value of Δ will again be proportional to a pressure. In use, gain need not necessarily be used as the scale for Δ. For example, voltage or current could be used.

In one embodiment, an analog to digital converter may convert a sensed voltage/current at Vout and sample over time. Based on the sampled levels and the timing of a measurement, the time when a predetermined measurement drop occurs (e.g., 3 dB or another Δ) will be recorded. The time will correspond to the frequency and, thus, the capacitance of the pressure sensor 100 as described above.

In one embodiment, more complex sensors may be formed by printing traces so that a plurality of capacitors can be formed and measured on a given section of foam.

Figure 4:
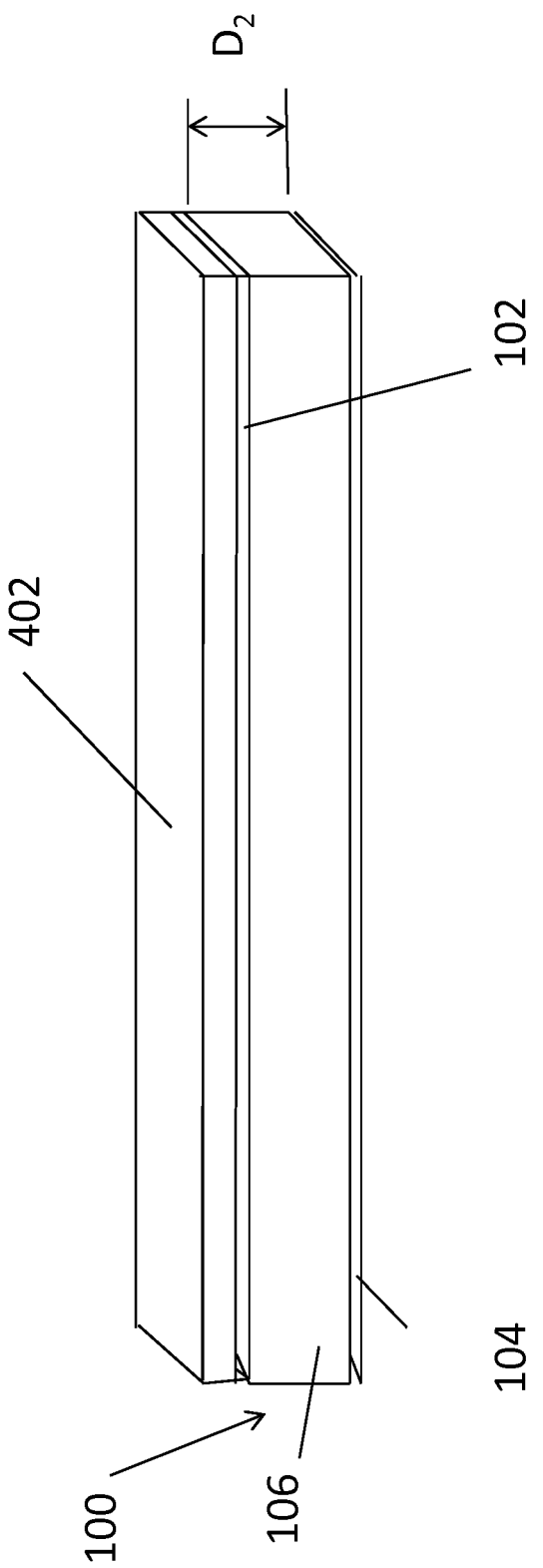
FIG. 4 shows a foam capacitor in combination with a piezoelectric sensor.

In another embodiment, and as shown in FIG. 4, the foam capacitor 100 may include a piezoelectric sensor 402 formed on one of the plates 102/104. In one embodiment, the piezoelectric sensor 402 is formed of conductor clad piezoelectric film disposed on a surface of one of the first or second plates of the capacitor 100. In one embodiment, the piezoelectric film/sensor 402 is configured to have a bandwidth (as defined by the measurement/sensor capacitance RC time constant) larger (i.e. lower RC) than the foam pressure sensor 100. In one embodiment, the RC time constant is an order or magnitude larger than that of the foam pressure sensor 100.

Figure 5:
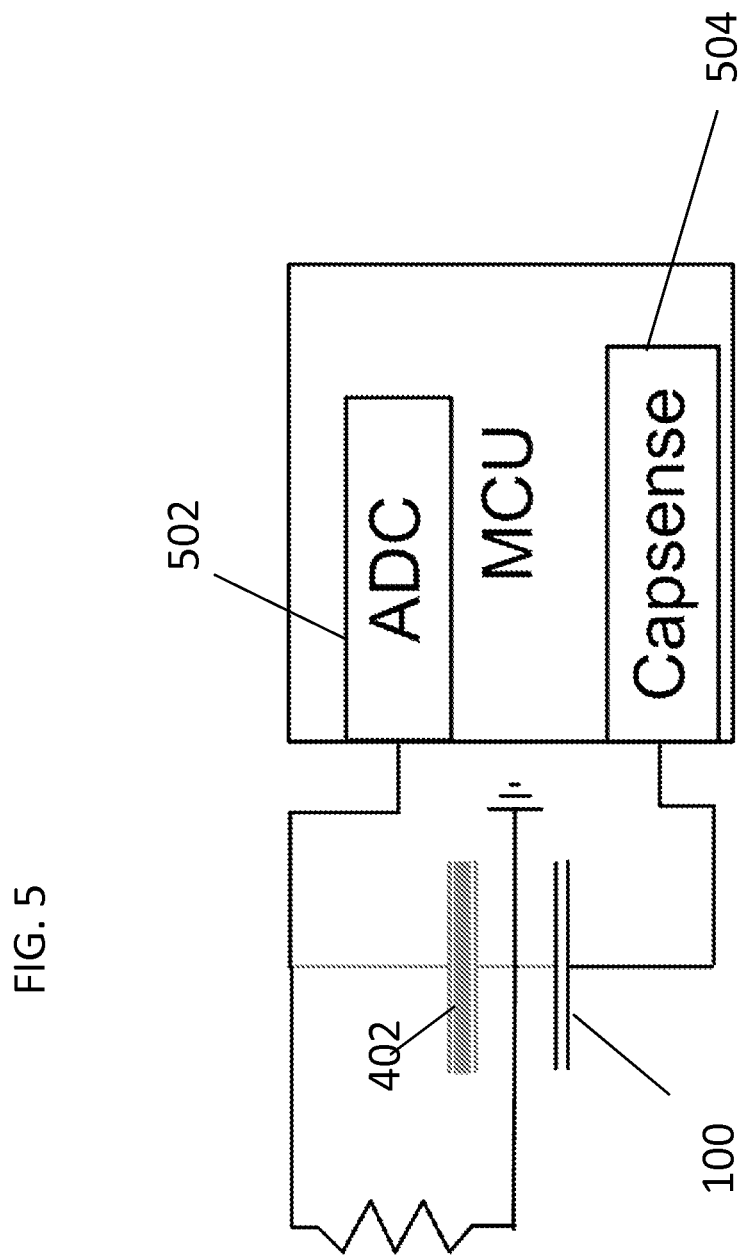
FIG. 5 shows a circuit for reading the combination of FIG. 5.

In such a case, the circuit of FIG. 5 may be used where the sensor 402 and foam capacitor 100 are connected in parallel. An analog to digital converter 502 measures the response of the sensor 402 in a known manner and the capacitance sensor 504 may operate as described above with respect to the circuit 200 shown in FIG. 2. In FIG. 5, The pressure conductor clad piezoelectric film is connected between the analog to digital converter 502 and the ground level and the foam capacitor is connected between the capacitance sensor 504 and the ground level.

The configuration shown in FIGS. 4 and 5 may provide a hybrid sensor having a high bandwidth impact sensor and a lower bandwidth pressure sensor. This would be able to measure the magnitude and duration of the impact.

The singular forms "a," "an," and "the" include plural referents unless the context clearly dictates otherwise. The endpoints of all ranges directed to the same characteristic or component are independently combinable and inclusive of the recited endpoint. All references are incorporated herein by reference. As used herein and throughout, "disposed," "contacted," and variants thereof refers to the complete or partial physical contact between the respective materials, substrates, layers, films, and the like. Further, the terms "first," "second," and the like herein do not denote any order, quantity, or importance, but rather are used to distinguish one element from another.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A hybrid sensor comprising:
   a first plate;
   a second plate;
   a foam disposed between the first and second plate;
   wherein the first plate, the second plate and the foam are disposed relative to each other forming a foam capacitor:
   a conductor clad piezoelectric film is disposed on a surface of one of the first or second plates forming a piezoelectric sensor;
   wherein the piezoelectric sensor has a bandwidth, defined by an intrinsic RC time constant of the piezoelectric sensor, that is larger than a bandwidth of the foam capacitor, providing a hybrid sensor having a high bandwidth impact sensor via the piezoelectric sensor, and a lower bandwidth pressure sensor via the foam capacitor.

2. The hybrid sensor of claim 1, wherein the foam has a density between 6 to 25 lbs/ft$^3$.

3. The hybrid sensor of claim 1, wherein the foam has a compression set of less than about 10%.

4. The hybrid sensor of claim 1, wherein the foam has a force-deflection of between about 1-9 psi (7-63 kPa).

5. The hybrid sensor of claim 1, wherein the plates are metallic.

6. The hybrid sensor of claim 1, wherein the foam is a polyurethane foam having an average cell size of about 50 to 250 μm and a density of between 5 to 30 lbs/ft$^3$.

7. The hybrid sensor of claim 1, wherein the first plate, the second plate, and the foam, form a foam capacitor, and wherein the foam capacitor and the conductor clad piezoelectric film are electrically connected to provide a common ground between them.

8. The hybrid sensor of claim 7, wherein the conductor clad piezoelectric film is connected between an analog to digital converter and the common ground.

9. The hybrid sensor of claim 7, wherein the foam capacitor is connected between a capacitance sensor and the common ground.

* * * * *